US011681377B2

(12) United States Patent
Fukumoto

(10) Patent No.: US 11,681,377 B2
(45) Date of Patent: Jun. 20, 2023

(54) LOW-PROFILE KEYBOARD

(71) Applicant: Microsoft Technology Licensing, LLC, Redmond, WA (US)

(72) Inventor: Masaaki Fukumoto, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/333,137

(22) Filed: May 28, 2021

(65) Prior Publication Data

US 2022/0050531 A1 Feb. 17, 2022

Related U.S. Application Data

(63) Continuation of application No. 16/910,835, filed on Jun. 24, 2020, now Pat. No. 11,137,833, which is a continuation of application No. 16/469,476, filed as application No. PCT/CN2016/110181 on Dec. 15, 2016, now Pat. No. 11,048,337.

(51) Int. Cl.

| | |
|---|---|
| ***G06F 3/02*** | (2006.01) |
| ***H01H 13/7065*** | (2006.01) |
| ***H01H 13/88*** | (2006.01) |
| ***H01H 13/702*** | (2006.01) |

(52) U.S. Cl.

CPC .......... *G06F 3/0202* (2013.01); *G06F 3/0221* (2013.01); *H01H 13/702* (2013.01); *H01H 13/7065* (2013.01); *H01H 13/88* (2013.01); *H01H 2223/052* (2013.01)

(58) Field of Classification Search

None

See application file for complete search history.

(56) References Cited

U.S. PATENT DOCUMENTS

| | | | | |
|---|---|---|---|---|
| 5,594,618 A * | 1/1997 | Sellers | G06F 1/1616 | 361/679.13 |
| 5,828,015 A * | 10/1998 | Coulon | H01H 3/125 | 200/344 |
| 9,785,195 B2 * | 10/2017 | Amarilio | G06F 1/1662 | |

OTHER PUBLICATIONS

"Office Action Issued in Chinese Patent Application No. 201680091408.1", dated Jun. 2, 2021, 7 Pages.

"Office Action Issued in European Patent Application No. 16923933.2", dated May 6, 2022, 7 Pages.

* cited by examiner

*Primary Examiner* — Felix O Figueroa

(57) ABSTRACT

A keyboard (110) includes a base board (116), keys (112), pitfalls (120) and a mode control mechanism (118). The keys (112) include cups (1124), and the mode control mechanism (118) may switch the keyboard (110) especially the key cups (1124) between different modes. In case that the keyboard (110) is not in use, these cups (1124) can be received in the pitfalls (120) to reduce the profile of the keyboard (110). In case that the keyboard (110) is to be used, the keys (112) may be raised up and arranged on the base board (116) in order to enable long keystroke and provide good typing experience.

20 Claims, 8 Drawing Sheets

LOW-PROFILE KEYBOARD

CROSS-REFERENCE TO RELATED APPLICATIONS

This application is a continuation of U.S. patent application Ser. No. 16/910,835, filed Jun. 24, 2020, which is a continuation of U.S. patent application Ser. No. 16/649,476, filed Jun. 13, 2019, which is a U.S. National Stage Application of PCT/CN2016/110181, filed Dec. 15, 2016, which application is hereby incorporated by reference. To the extent appropriate, a claim of priority is made to each of the above disclosed applications.

BACKGROUND

Keyboards are widely used as input devices. Devices such as laptop computers are usually equipped with keyboards for information input. Keyboards may be categorized into different types including mechanical keyboards, membrane keyboards, conductive rubber keyboards, and so on. In operations, keys on the keyboards are pressed by users numerously and repeatedly, and as a result, the typing experience has immediate impact on the efficiency and experience of the users operations. Various technologies have been proposed to provide better typing experience. These conventional solutions, however, compromise other aspects such as complexity, size, appearance and/cost.

SUMMARY

Embodiments of the subject matter described herein provide a keyboard and an electronic device. The keyboard comprises a base board, keys, pitfalls and a mode control mechanism. The keys include respective cups, and the mode control mechanism may switch the keyboard especially the key cups between different modes. In case that the keyboard is not in use, these cups can be received in the pitfalls to reduce the profile of the keyboard. In case that the keyboard is to be used, the keys may be raised up and arranged on the base board in order to enable long keystroke and provide good typing feel.

It is to be understood that the Summary is not intended to identify key or essential features of implementations of the subject matter described herein, nor is it intended to be used to limit the scope of the subject matter described herein. Other features of the subject matter described herein will become easily comprehensible through the description below.

BRIEF DESCRIPTION OF THE DRAWINGS

The above and other objectives, features and advantages of the subject matter described herein will become more apparent through more detailed depiction of example embodiments of the subject matter described herein in conjunction with the accompanying drawings, wherein in the example embodiments of the subject matter described herein, same reference numerals usually represent same components.

FIGS. 1A1 and 1A2 illustrate stereoscopic diagrams of a keyboard according to embodiments of the subject matter described herein;

FIG. 2 illustrates a cross-section view of a keyboard in a first mode according to an embodiment of the subject matter described herein;

DETAILED DESCRIPTION

Hereinafter, the subject matter described herein will be discussed with reference to a plurality of embodiments. It should be understood that discussion of these embodiments is to enable a person of normal skill in the art to better understand and thereby implement the subject matter described herein, not implying any limitation to the scope of the subject matter described herein.

As used herein, the phrase "include(s)" and its variants shall be interpreted as an open term meaning "including but not limited to." The phrase "based on" shall be interpreted as "at least partially based on." The phrase "an embodiment" or "one embodiment" shall be interpreted as "at least one embodiment." The phrase "another embodiment" shall be interpreted as "at least one other embodiment." The phrases like "first" and "second" may refer to different or the same objects. Other definitions might also be included explicitly and implicitly in the following description.

Some values or value ranges might be described in the following. It is to be understood that these values and value ranges are only for the purpose of illustration, which may be advantageous to practice the idea of the subject matter described herein. However, depiction of these examples is not intended to limit the scope of the subject matter described herein in any manner. According to the specific application scenarios and needs the values or value ranges may be set otherwise.

As mentioned above, typing experience is an important metric for a keyboard. However, it is found that good typing experience usually requires relative long keystroke. In a trend of miniaturization, long keystroke significantly will inevitably increase the overall profile of electronic devices, which in turn results in increase of complexity and cost.

Embodiments of the subject matter described herein provide a keyboard with good typing experience without increasing the keyboard profile. By having pitfalls in the base board, the keys are on the base board in case that the keyboard is in use, and the keys can be received in the base board in case that the keyboard is not used. As such, the thickness of the base board is utilized to implement low profile of the keyboard without degrading the user experience of keystroke. In addition, the keyboard can be easily designed and manufactured without much complexity.

Figure 1B:
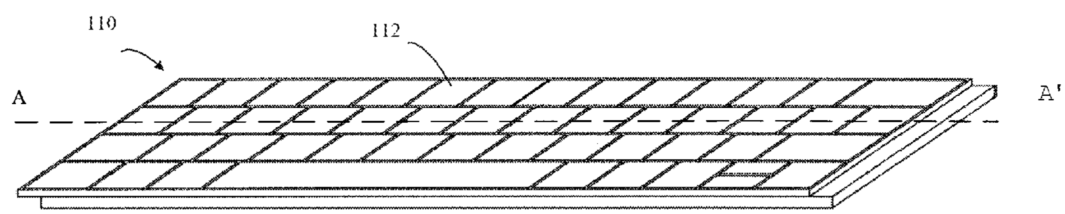
FIG. 1B illustrates a cross-section view of the keyboard of FIG. 1A along the line A-A'.
Figure 1B:
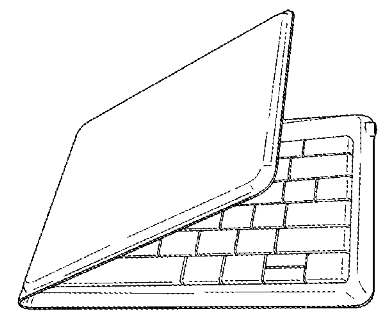
Figure 1B:
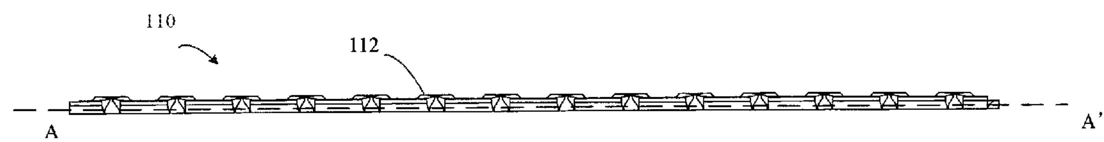

FIG. 1A1 illustrates a stereoscopic diagram of a keyboard 110 in which embodiments of the subject matter described herein can be implemented. As shown, the keyboard 110 includes a plurality of keys 112. The keyboard 110 may be used with electronic devices, such as tablets. The electronic device may include, among other components, a CPU, a memory, a communication device and a display. It is to be understood that although the keyboard 110 is shown to be a separate component which can be connected to host device in wired and/or wireless manners in this example, this is merely for illustration without suggesting any limitations as to the scope of the subject matter described here. In alternative embodiments, the keyboard 110 may be integrated to the electronic device, such as a laptop computer. Furthermore, although the keyboard 110 is shown to be one flat piece in FIG. 1A1, it may be foldable in some embodiments, as illustrated in FIG. 1A2.

FIG. 1B illustrates a cross-section view of the keyboard 110 of FIG. 1A along the line A-A'. As shown, a plurality of keys 112 are arranged in a row. This is merely for illustration without suggesting any limitations as to the scope of the subject matter described here. It is to be understood that other arrangement may be possible. For brevity and clarity, only one key is shown in the subsequent figures without suggesting any limitations as to the scope of the subject matter described here.

Figure 2:
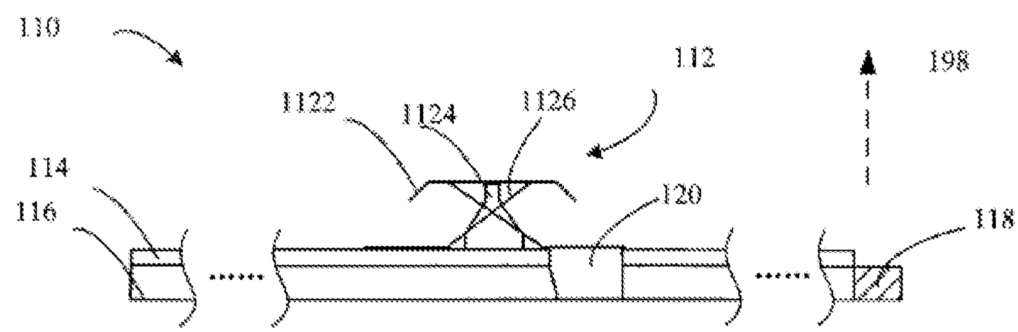

FIG. 2 illustrates a cross-section view of the keyboard 110 in a mode where the keyboard 110 is available for typing. Such a mode is referred to "first mode" hereafter. On the other hand, the mode in which the keyboard 110 is not available for typing (but may still be available for other purposes) is referred to "second mode".

As shown, the keyboard 110 includes a base board 116, a membrane circuit 114, keys 112, a mode control mechanism 118 and pitfalls 120. The membrane circuit 114 has regions corresponding to the keys, respectively. In the example shown in FIG. 2, the mode control mechanism 118 is a handle. The handle may be a separate component connecting to the base board 116. The base board 116 is pushed or pulled in response to the push or pull for the handle. This is merely for illustration without suggesting any limitations as to the scope of the subject matter described here. The handle may be integrated with the base board 116. In the following, some embodiments will be described where the handle functions as the mode control mechanism. It is to be understood however that the mode control mechanism may be implemented in other forms, such as a magnetic device that functions magnetically to switch modes of the keyboard.

According to embodiments of the subject matter described herein, the keys 112 are of a scissor type. Specifically, each key 112 has a cap 1122, a cup 1124 and a scissor element 1126. In the first mode, the keyboard 110 is orientated in a first direction 198. At this point, the keys 112 are on the membrane circuit 114 for typing. As used herein, the term "cup" refers to any suitable element, either hollow or solid, that can be elastically deformed in the first direction 198 and can be used to trigger the membrane circuit 114. The cup can be of any shapes and/or materials. Once a key 112 is pressed down, the cup 1124 and the scissor element 1126 deform to trigger the region of the membrane circuit 114 under the keys 112 to generate an electrical signal indicative of a character.

Figure 3:
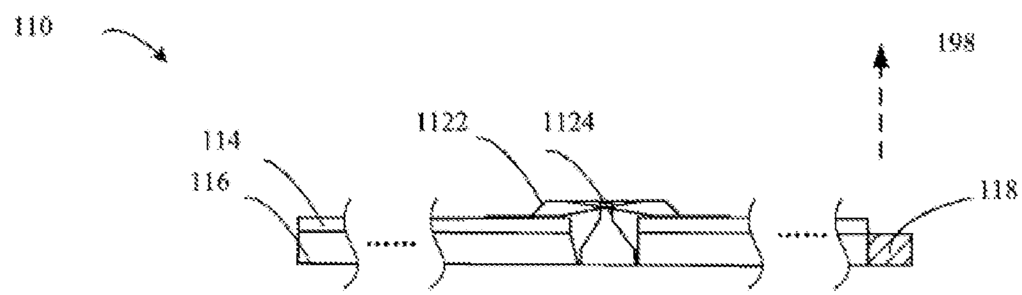
FIG. 3 illustrates a cross-section view of a keyboard in a second mode according to an embodiment of the subject matter described herein.

FIG. 3 illustrates a cross-section view of the keyboard 110 in a second mode according to an embodiment of the subject matter described herein. The user may switch the keyboard 110 from the first mode to the second mode by operating the mode control mechanism 118. For example, in those embodiments where a handle functions as the control mechanism 118, the handle can be pushed to cause the base board 116 and the keys 112 to move with respect to each other. Upon alignment of the keys 112 and the pitfalls 120, the cups 1124 of the keys 112 fall into the pitfalls 120 in a vertical direction. Without support from the cups 1124, the scissor elements 1126 deform to reduce height to allow the keyboard 110 to enter the second mode, thereby reducing the profile of the keyboard 110 in case that it is not in use.

Figure 4:
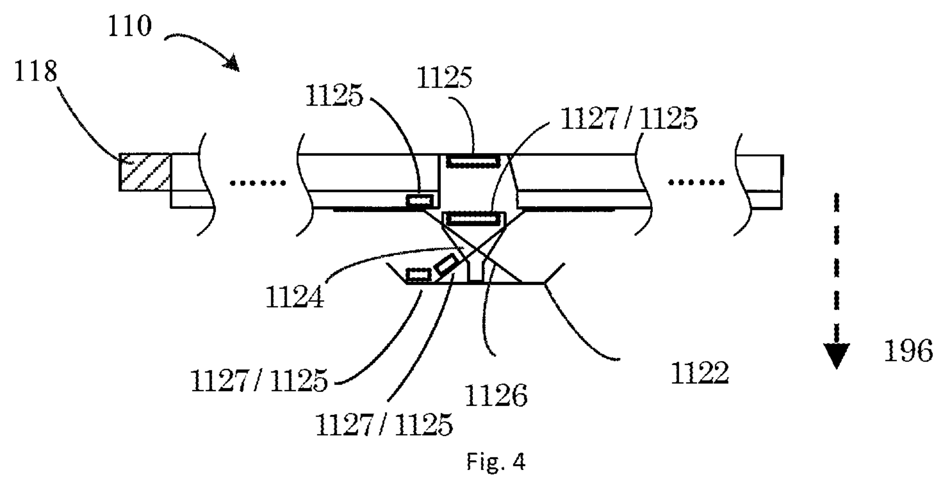
FIGS. 4 and 5 illustrate schematic views of a progress in which a keyboard switches from the second mode to the first mode according to an embodiment of the subject matter described herein.
Figure 5:
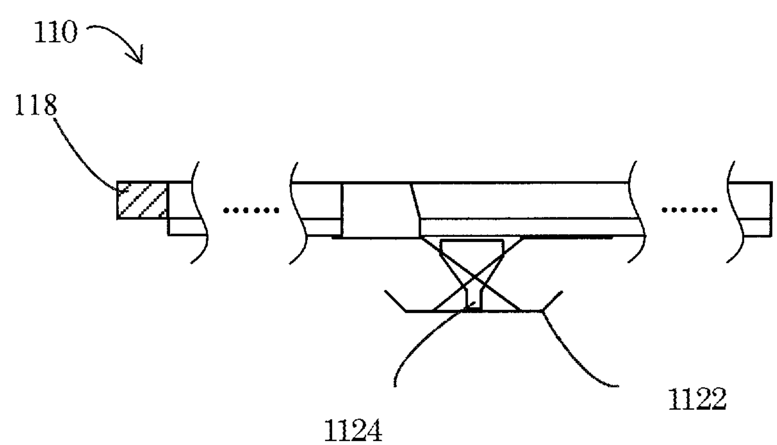

FIGS. 4-5 show a process of switching the keyboard 110 from the second mode to the first mode. As shown in FIG. 4, if the keyboard 110 is about to be used, the keyboard 110 may be inverted into an upside-down state so that the keyboard 110 is orientated in a second direction that is opposite to the first direction. The second direction is shown as the arrow 196 in FIG. 4. In this state, the cups 1124 of the keys 112 fall out of the pitfalls 120, and the scissor elements 1126 deform into a normal use state. The mode control mechanism 118 may be operated (e.g., pulled) and the keys 112 are not aligned with the pitfalls 120. Then the keyboard 110 may be inverted again such that the keyboard 110 goes back to the first mode, as shown in FIG. 2.

It is to be understood that other mode control mechanism 118 may be employed. For example, the mode control mechanism may include electromagnetic components 1125 electrically coupled to the power unit. The cups 1124 include magnetic components 1127. In case that the keyboard 110 is in the first direction and is about to be used, the electromagnetic components 1125 may be powered on to repel or push the magnetic components 1127 in the cups 1124. As a result, the keys 112 will pop out from the pitfalls 120. Then, the keys 112 may be moved back to the first mode as shown in FIG. 2, either by the mode control mechanism 118 or automatically by electrical or magnetic force.

In some embodiments, the electromagnetic components 1125 may be arranged at the bottom of the pitfalls or on the membrane circuit 114, for example. Other arrangements are possible as well. In other embodiments, the magnetic components 1127 in the cups 1124 may be replaced with electromagnetic components 1125, as long as the electromagnetic components 1125 of the mode control mechanism repel the electromagnetic components 1125 of the cups 1124 if the user switches the keyboard 110 from the second mode to the first mode. Likewise, the magnetic/electromagnetic components 1127/1125 of the cups 1124 may be replaced with magnetic/electromagnetic components 1127/1125 in the caps 1122 or in the scissor elements 1126, also as long as the electromagnetic components 1125 of the mode control mechanism repel the magnetic/electromagnetic components 1127/1125 if the user switches the keyboard 110 from the second mode to the first mode.

Figure 6:
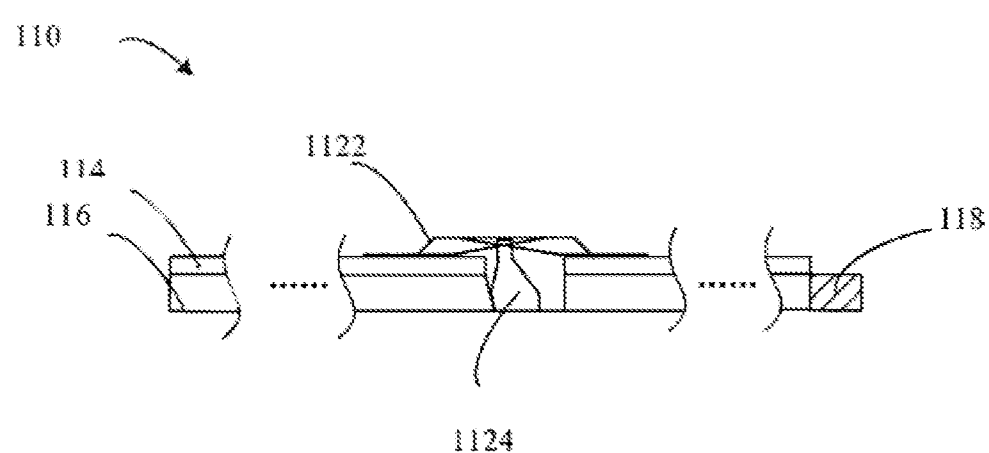
FIG. 6 illustrates a schematic view of a keyboard in case of an undesired push without a locking mechanism according to an embodiment of the subject matter described herein.
Figure 7A:
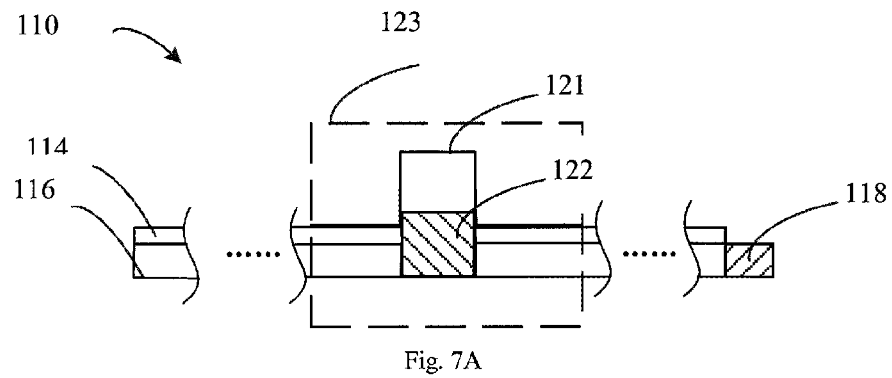
FIG. 7A illustrates a cross-section view of a keyboard including a locking mechanism in a first mode according to an embodiment of the subject matter described herein.
Figure 7B:
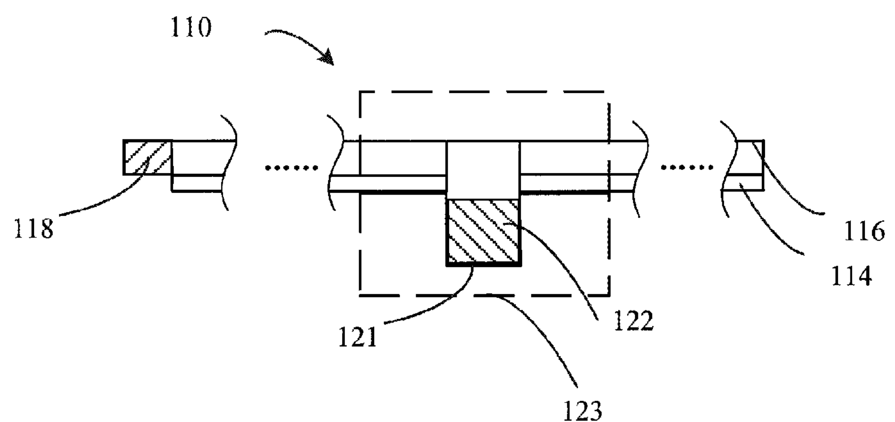
FIG. 7B illustrates a cross-section view of an inverted keyboard including a locking mechanism according to an embodiment of the subject matter described herein.

It will be appreciated that in some cases, the user may unintentionally touch the mode control mechanism 118 (for example, push the handle) even while the keyboard 110 is in the second mode. As an example, FIG. 6 illustrates a schematic view of the keyboard 110 under an undesired push. In this case, the cups 1124 may collide with side wall of the pitfalls 120. The cups 1124 may thus be broken or deteriorated. In order to prevent the keyboard from such damage, in some embodiments, the keyboard 110 may be equipped with a locking mechanism 123 for protection. FIGS. 7A and 7B illustrate an example locking mechanism 123.

In this example, the locking mechanism 123 includes a rigid pin 122 and a cover 121 fixed to the keys of the keyboard 110. In case that the keyboard 110 is in the second mode, the rigid pin 122 is in the pitfalls 120. The height of the rigid pin 122 exceeds the depth of the pitfalls 120. While the keyboard 110 is set in the second mode, the cups 1124 would not move because the pin 122 prevents the movement of the cover 121 and the keys 112.

It is to be understood that the locking mechanism 123 as described above is only for illustration, without suggesting any limitations as to the scope of the subject matter described herein. Other locking mechanism can be employed as well. For example, a directional lock may be coupled to the mode control mechanism, such that the mode control mechanism cannot be pushed in the second mode. With the locking mechanism 123, the cups 1124 are kept still with respect to the sidewalk of the pitfalls 120 even if the handle is unintentional pushed in some embodiments, so that the keyboard 110 may be kept intact and breakage of the cups 1124 may be avoided.

In order to ease the falling of the cups 1124, in some embodiments, each of the pitfalls 120 may be designed to have an area exceeding footprint of the cups 1124. It will be appreciated that in some cases, the user would probably unintentionally invert the keyboard 110. In the case that the area of the pitfalls 120 exceeding footprint of the cups 1124 and the keyboard 110 is inverted, the cups 1124 may pop out or drop out of the pitfalls 120 undesirably, and a screen of a tablet covering the keyboard may thus get damaged. In order to deal with this situation, the keyboard 110 may be equipped with a stopper to prevent undesired pop out of keys. FIGS. 8A-8H show such an example embodiment.

Figure 8A:
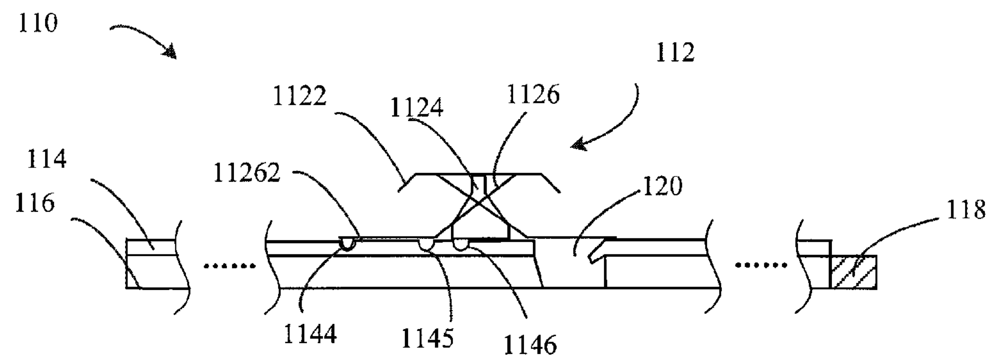
FIG. 8A illustrates a cross-section view of a keyboard including check valves of a membrane sliding into pitfalls in a first mode according to an embodiment of the subject matter described herein.
Figure 8B:
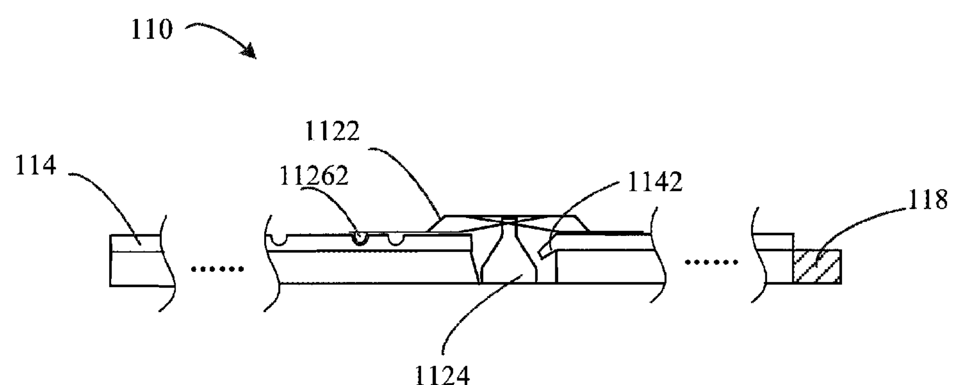
FIG. 8B illustrates a cross-section view of a keyboard including check valves of a membrane sliding into pitfalls in a second mode according to an embodiment of the subject matter described herein.
Figure 8C:
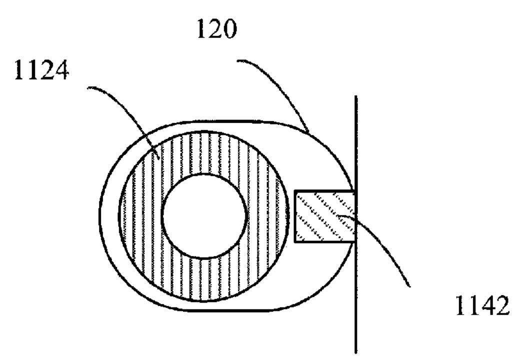
FIG. 8C illustrates a schematically top view of the check valves and the cups of FIG. 8B.

In the embodiment shown in FIGS. 8A-8H, the membrane circuit 114 has one or more check valves 1142 extending above the pitfalls 120, respectively. The check valves 1142 are parts of the membrane circuit 114 that may slant into the pitfalls, as shown in FIG. 88. FIG. 8C shows a schematically top view of the check valves 1142 and the cups 1124 of FIG. 88. In the second mode, the cups 1124 fall into the pitfalls 120. The pitfalls 120 have an oval shape in the top view. The check valves 1142 hang in the pitfalls 120. At this point, the cups 1124 have a certain distance from the check valves 1142. The check valves 1142 may be integrated with the membrane circuit 114, or may be formed separately.

Figure 8D:
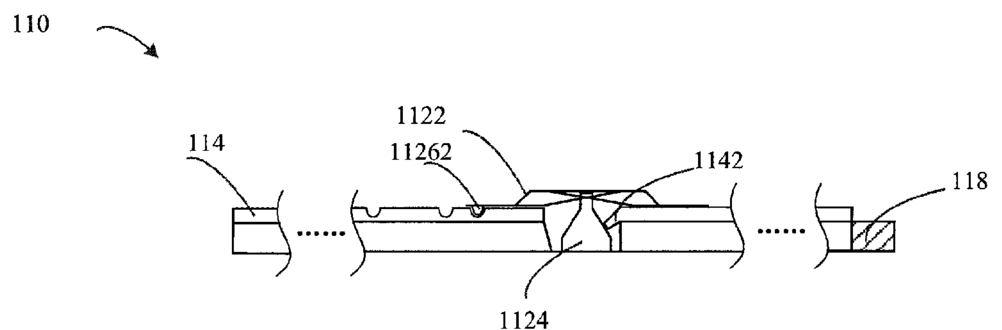
FIG. 8D illustrates a cross-section view of a keyboard including check valves of a membrane sliding into pitfalls in a second mode according to another embodiment of the subject matter described herein.
Figure 8E:
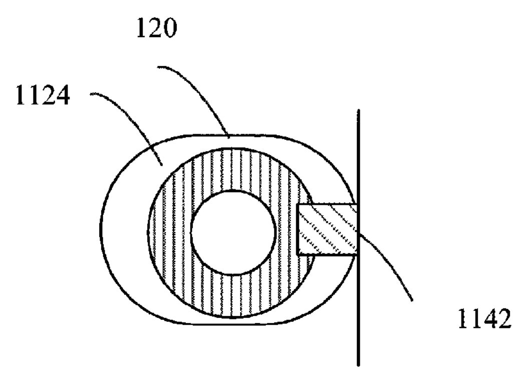
FIG. 8E illustrates a schematically top view of the check valves and the cups of FIG. 8D.
Figure 8F:
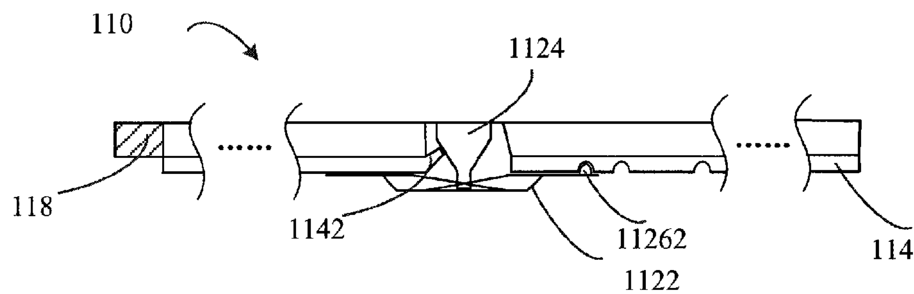
FIG. 8F illustrates a cross-section view of an inverted keyboard including check valves of a membrane sliding into pitfalls according to an embodiment of the subject matter described herein.

In this embodiment, the mode control mechanism 118 is a handle. After the handle is pushed to cause the cups 1124 to fall into the pitfalls 120, the handle may be further pushed, such that the edges of the check valves 1142 contact or nearly contacts the cups 1124, as shown in FIG. 8D, FIG. 8E shows a schematically top view of the check valves 1142 and the cups 1124 of FIG. 8D. The "shoulders" of the cups 1124 are in contact with the check valves 1142.

Figure 8G:
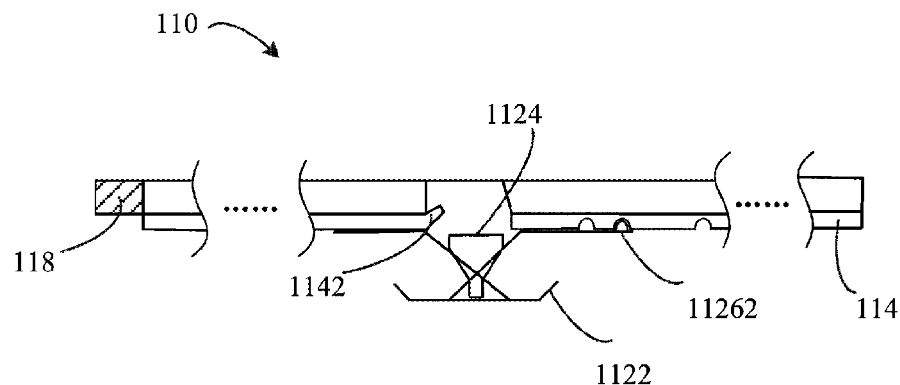
FIG. 8G illustrates a cross-section view of an inverted keyboard including check valves of a membrane sliding into pitfalls according to another embodiment of the subject matter described herein.
Figure 8H:
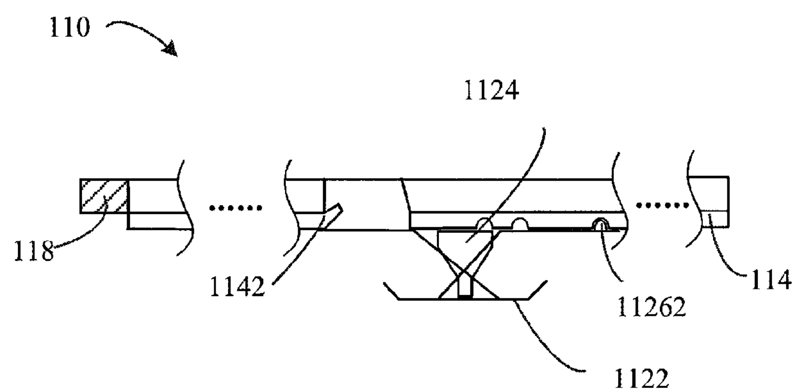
FIG. 8H illustrates a cross-section view of an inverted keyboard including check valves of a membrane sliding into pitfalls according to yet another embodiment of the subject matter described herein.

In other words, the handle has three gear positions. Upon an initial push, the handle may switch from a first position to a second position, and may further change from the second position to a third position under a further push. If the keyboard 110 is undesirably flipped, the check valves 1142 prevent the cups 1124 from pop out, as shown in FIG. 8H. Only after the handle is pushed back to the second position, the cups 1124 drop, as shown in FIG. 8G. Then, the handle may be further pushed to the first position for inverting, as shown in FIG. 8H. With this two-step push mechanism and the check valves 1142, the check valves 1142 may hold the cups 1124 in the second direction, and prevent the cups 1124 from dropping out of the pitfalls, even if the keyboard 110 is accidentally inverted.

In order to indicate the three gear positions, latching mechanisms may be employed. FIGS. 8A-8B, 8D and 8F-8H show latching mechanisms of the keyboard according to an embodiment. In this example, the latching mechanisms include three pits 1144, 1145 and 1146 and a bump 11262 for each key 112. The three pits 1144, 1145 and 1146 are arranged on top of the membrane circuit 114, and the bump 11262 is arranged on the bottom face of the extensions of the scissor elements 1126. The bump 11262 is operable to match the three pits 1144, 1145 and 1146. In case that the bump 11262 is in one of the pits 1144, 1145 and 1146, the keys 112 and the membrane circuit 114 in a relatively stable state.

Corresponding to the handle switching from a first position to a second position, the bump 11262 slide from the pit 1144 into the pit 1145, as shown in FIGS. SA and SB, and corresponding to the handle switch from the second position to a third position, the hump 11262 slide from the pit 1145 into the pit 1146, as shown in FIGS. 8B and 8D. In case that the keyboard 110 is inverted, the bump 11262 may slide from the pit 1146 into the pit 1145, as shown in FIGS. SF and SG, corresponding to the handle switch from the third position to the second position. The bump 11262 may further slide from the pit 1145 into the pit 1144, as shown in FIGS. 8G and 8H, corresponding to the handle switch from the second position to the first position. With the latching mechanisms, users may readily acknowledge completion of the handle push or pull. It is to be understood that the latching mechanisms may be implemented in other forms, such as an indicator indicating states of the magnetic device that functions magnetically to switch modes of the keyboard.

Although the check valves 1142 are used as the stopper to prevent the cups 1124 from dropping out of the pitfalls, this is just an example without suggesting any limitations as to the scope of the subject matter described herein. Other forms of stoppers may be used as well. For example, the electromagnetic components at the bottom of the pitfalls 120 may attract the magnetic components in the cups 1124 in case the keyboard 110 is in the second mode.

Figure 9A:
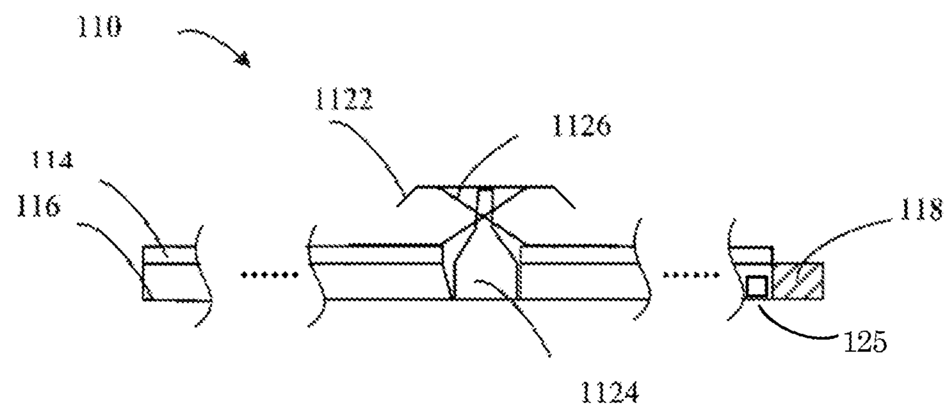
FIG. 9A illustrates a cross-section view of a keyboard with full-height cups according to an embodiment of the subject matter described herein.
Figure 9B:
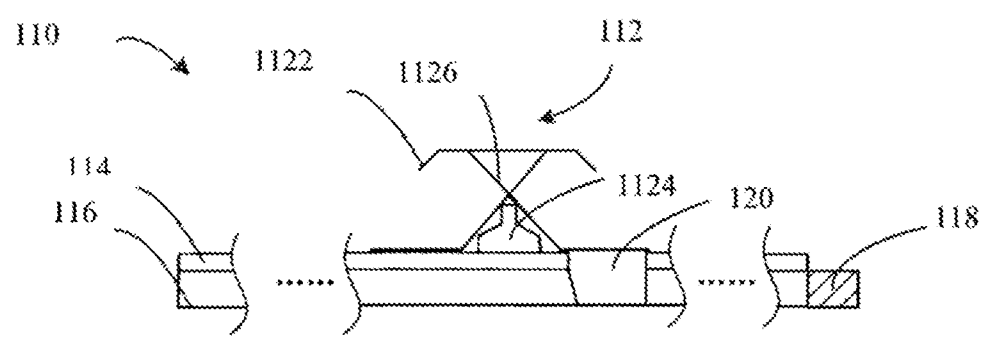
FIG. 9B illustrates a cross-section view of a keyboard with half-height cups in a first mode according to an embodiment of the subject matter described herein.
Figure 9C:
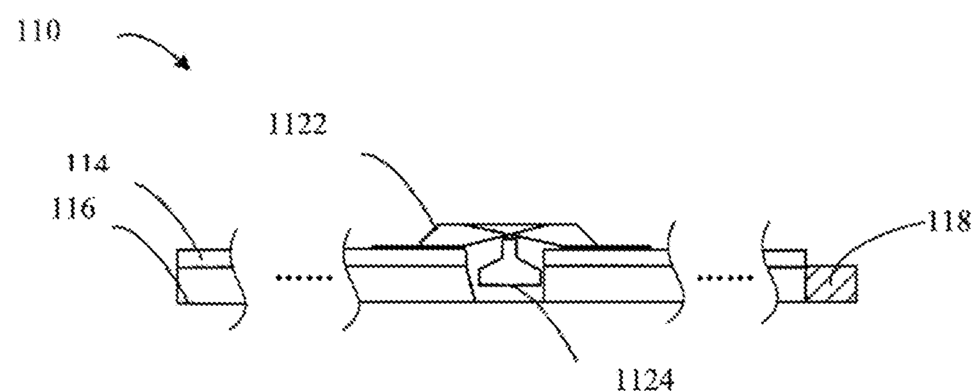
FIG. 9C illustrates a cross-section view of a keyboard with half-height cups in a second mode according to an embodiment of the subject matter described herein.

In some embodiments, some of the keys 112 on the keyboard 110 may have larger cups 1124 for providing longer stroke. Even if these cups falls into the pitfalls 120, these cups 1124 still have a large part outside the pitfalls 120, as shown in FIG. 9A. In order to further reduce the profile of the keyboard 110, FIGS. 9B-9C shows an embodiment without degrading the user experience of keystroke. The cups 1124 are attached to the midpoints of the scissor elements 1126, instead of being attached to the caps 1122.

As compared to the cups 1124 in FIG. 9A, the cups 1124 in FIG. 9B have a half height. In this case, the cups 1124 in FIG. 9A refers to cups 1124 with a full height, and the cups 1124 in FIGS. 9B and 9C refer to cups 1124 with a half-height. In case that the keyboard 110 is in the second mode, the scissor elements 1122 deform to further reduce the profile with the cups 1124 hanging over the bottom of the pitfalls 120 or just contacting the bottom of the pitfalls 120. With the half-height cups 1124 attached to the midpoints of the scissor elements 1126, the keystroke will not be affect, but the height of the scissor elements 1126 may be further reduced in case the keyboard 110 is in the second mode. As a result, the overall profile of the keyboard 110 may be further reduced. This is especially useful for portable devices, such as laptop computers.

In another embodiment, as shown in FIG. 9A, the mode control mechanism 118 is connected to a power module 125 of the keyboard 110. The mode control mechanism 118 is operable to trigger the power module 125 to power off the keyboard 110 in response to a switch from the first position to the second position and power on the keyboard 110 in response to a switch from the second position to the first position, since the first mode corresponds to the using state and the second mode corresponds to the shutdown state in this embodiment. In another embodiment, the latching mechanisms 118 is further connected to a power module 125 or a switch of an electronic device, such as a tablet, in case that the keyboard 110 is connected to the electronic device. In this embodiment, the mode control mechanism 118 is operable to power on/off the electronic device or lighten/locking display of the electronic device.

Figure 10:
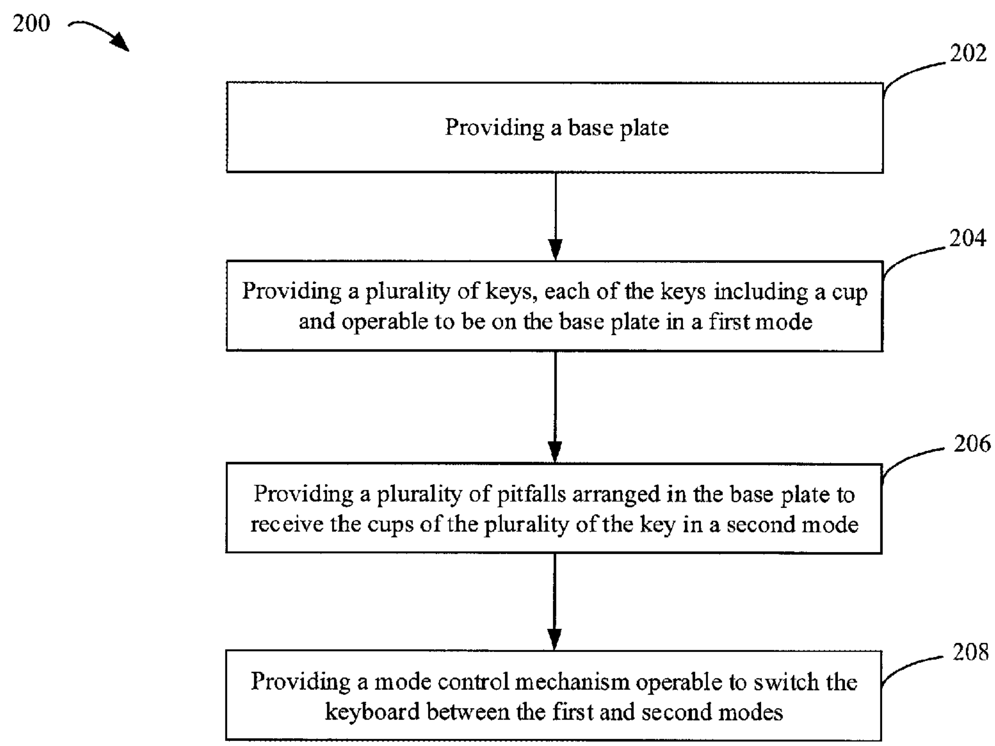
FIG. 10 illustrates a flowchart of a method of manufacturing a keyboard according an embodiment of the subject matter described herein.

FIG. 10 shows a flowchart of a method 200 of manufacturing a keyboard. It should be understood that the method 200 may also comprise additional steps not shown and/or omit the illustrated steps. Scope of the subject matter described herein is not limited in this aspect.

At 202, it is provided a base board. At 204, it is provided keys. The keys include cups and are operable to be on the base board in a first mode. At 206, it is provided pitfalls arranged in the base board to receive the cups of the keys in a second mode. At 208, it is provided a mode control mechanism operable to switch the keyboard between the first and second modes, it is to be understood that all features about the keyboard 110 as described above with reference to FIGS. 1 to 9 apply to the manufacturing method, which will not be detailed here.

Hereinafter, some example implementations of the subject matter described herein will be listed.

In some embodiments, there is provided a keyboard. The keyboard comprises a base board, keys, pitfalls and a mode control mechanism. The keys include cups and are operable to be arranged on the base board in a first mode. The pitfalls are arranged in the base board, and are operable to receive the cups of the respective keys in a second mode. The mode control mechanism is operable to switch the keyboard between the first and second modes.

In some embodiments, the mode control mechanism includes a handle connected to the base board and operable to be pushed from a first position to a second position to switch the keyboard from the first mode to the second mode. The cups are operable to be pushed into the pitfalls in response to a switch from the first mode to the second mode, and the cups are arranged onto the base board in response to a switch from the second mode to the first mode.

In some embodiments, the keyboard further comprises a locking mechanism operable to disable the mode control mechanism to switch between the first and second modes.

In some embodiments, the locking mechanism comprises a pin and a cover for covering the pin. The pin has a height exceeding a depth of the pitfalls and is operable to tall into one of the pitfalls in response to a switch from the first mode to the second mode.

In some embodiments, the keyboard further comprises a stopper operable to prevent pop-out of the keys in the second mode.

In some embodiments, the keyboard further comprises a membrane circuit including check valves extending above the pitfalls as the stopper.

In some embodiments, the check valves of the membrane are operable to slant into the pitfalls.

In some embodiments, the handle is operable to be pushed to a third position different from the first and second positions to prevent pop-out of the keys.

In some embodiments, the keys include respective scissor elements, the cups being connected to midpoints of the scissor elements.

In some embodiments, the handle is connected to a power module of the keyboard. The handle is operable to trigger the power module to power off the keyboard in response to a switch from the first position to the second position and power on the keyboard in response to a switch from the second position to the first position.

In some embodiments, the mode control mechanism is operable to cause the keyboard to switch from the first mode to the second mode if the keyboard is orientated in a first direction. The mode control mechanism is operable to cause the keyboard to be switch from the second mode to the first mode if the keyboard is orientated in a second direction opposite to the first direction.

In some embodiments, the mode control mechanism is operable to cause the cups to fall into the pitfalls if the keyboard is orientated in the first direction and to cause the cups to pop out from the pitfalls if the keyboard is orientated in the second direction.

In some embodiments, the cups include magnetic components, and the mode control mechanism includes electromagnetic components operable to push the magnetic components to raise the cups.

In some embodiments, the electromagnetic components are arranged at the bottom of the pitfalls and operable to push the magnetic components to pop out the cups in response to a switch from the second mode to the first mode.

In some embodiments, the keys include respective key caps having magnetic components. The mode control mechanism includes electromagnetic components arranged at the bottom of the pitfalls. The electromagnetic components are operable to push the magnetic components to raise the caps in response to a switch from the second mode to the first mode.

In some embodiments, the keys include respective key caps having first electromagnetic components. The mode control mechanism includes second electromagnetic components in the membrane circuit. The second electromagnetic components are operable to push the first electromagnetic components to raise the cups.

In some embodiments, the keyboard is foldable.

In some embodiments, it is provided an electronic device comprising a keyboard. The keyboard comprises a base board, keys, pitfalls and a mode control mechanism. The keys include cups and are operable to be arranged on the base board in a first mode. The pitfalls are arranged in the base board, and are operable to receive the cups of the respective keys in a second mode. The mode control mechanism is operable to switch the keyboard between the first and second modes.

In some embodiments, the mode control mechanism includes a handle connected to the base board and operable to be pushed from a first position to a second position to switch the keyboard from the first mode to the second mode. The cups are operable to be pushed into the pitfalls in response to a switch from the first mode to the second mode, and the cups are arranged onto the base board in response to a switch from the second mode to the first mode.

In some embodiments, the keyboard further comprises a locking mechanism operable to disable the mode control mechanism to switch between the first and second modes.

In some embodiments, the locking mechanism comprises a pin and a cover for covering the pin. The pin has a height exceeding a depth of the pitfalls and is operable to fail into one of the pitfalls in response to a switch from the first mode to the second mode.

In some embodiments, the keyboard further comprises a stopper operable to prevent pop-out of the keys in the second mode.

In some embodiments, the keyboard further comprises a membrane circuit including check valves extending above the pitfalls as the stopper.

In some embodiments, the check valves of the membrane are operable to slant into the pitfalls.

In some embodiments, the handle is operable to be pushed to a third position different from the first and second positions to prevent pop-out of the keys.

In some embodiments, the keys include respective scissor elements, the cups being connected to midpoints of the scissor elements.

In some embodiments, the handle is connected to a power module of the keyboard. The handle is operable to trigger the power module to power off the keyboard in response to a switch from the first position to the second position and power on the keyboard in response to a switch from the second position to the first position.

In some embodiments, the mode control mechanism is operable to cause the keyboard to be switch from the first mode to the second mode if the keyboard is orientated in a first direction. The mode control mechanism is operable to cause the keyboard to be switch from the second mode to the first mode if the keyboard is orientated in a second direction opposite to the first direction.

In some embodiments, the mode control mechanism is operable to cause the cups to fall into the pitfalls if the keyboard is orientated in the first direction and to cause the cups to pop out from the pitfalls if the keyboard is orientated in the second direction.

In some embodiments, the cups include magnetic components, and the mode control mechanism includes electromagnetic components operable to push the magnetic components to raise the cups.

In some embodiments, the electromagnetic components are arranged at the bottom of the pitfalls and operable to push the magnetic components to pop out the cups in response to a switch from the second mode to the first mode.

In some embodiments, the keys include respective key caps having magnetic components. The mode control mechanism includes electromagnetic components arranged at the bottom of the pitfalls. The electromagnetic components are operable to push the magnetic components to raise the caps in response to a switch from the second mode to the first mode.

In some embodiments, the keys include key caps having first electromagnetic components. The mode control mechanism includes second electromagnetic components in the membrane circuit. The second electromagnetic components are operable to push the first electromagnetic components to raise the cups.

In some embodiments, the keyboard is foldable.

In some embodiments, the keyboard is detachable from the electronic device.

In some embodiments, it is provided a method for manufacturing a keyboard. The method includes providing a base board, providing keys, providing pitfalls and providing a mode control mechanism. The keys include respective cups and are operable to be on the base board in a first mode. The pitfalls are arranged in the base board to receive the cups of the respective keys in a second mode. The mode control mechanism is operable to switch the keyboard between the first and second modes.

In some embodiments, the mode control mechanism includes a handle connected to the base board and operable to be pushed from a first position to a second position to switch the keyboard from the first mode to the second mode. The cups are operable to be pushed into the pitfalls in response to a switch from the first mode to the second mode, and the cups are arranged onto the base board in response to a switch from the second mode to the first mode.

In some embodiments, the method further comprises providing a locking mechanism operable to disable the mode control mechanism to switch between the first and second modes.

In some embodiments, the locking mechanism comprises a pin and a cover for covering the pin. The pin has a height exceeding a depth of the pitfalls and is operable to fall into one of the pitfalls in response to a switch from the first mode to the second mode.

In some embodiments, the method further comprises providing a stopper operable to prevent pop-out of the keys in the second mode.

In some embodiments, the method further comprises providing a membrane circuit including check valves extending above the pitfalls as the stopper.

In some embodiments, the check valves of the membrane are operable to slant into the pitfalls.

In some embodiments, the handle is operable to be pushed to a third position different from the first and second positions to prevent pop-out of the keys.

In some embodiments, the keys include respective scissor elements, the cups being connected to midpoints of the scissor elements.

In some embodiments, the handle is connected to a power module of the keyboard. The handle is operable to trigger the power module to power off the keyboard in response to a switch from the first position to the second position and power on the keyboard in response to a switch from the second position to the first position.

In some embodiments, the mode control mechanism is operable to cause the keyboard to be switch from the first mode to the second mode if the keyboard is orientated in a first direction. The mode control mechanism is operable to cause the keyboard to be switch from the second mode to the first mode if the keyboard is orientated in a second direction opposite to the first direction.

In some embodiments, the mode control mechanism is operable to cause the cups to fall into the pitfalls if the keyboard is orientated in the first direction and to cause the cups to pop out from the pitfalls if the keyboard is orientated in the second direction.

In some embodiments, the cups include respective magnetic components, and the mode control mechanism includes electromagnetic components operable to push the magnetic components to raise the cups.

In some embodiments, the electromagnetic components are arranged at the bottom of the pitfalls and operable to push the magnetic components to pop out the cups in response to a switch from the second mode to the first mode.

In some embodiments, the keys include respective key caps having magnetic components. The mode control mechanism includes electromagnetic components arranged at the bottom of the pitfalls. The electromagnetic components are operable to push the magnetic components to raise the caps in response to a switch from the second mode to the first mode.

In some embodiments, the keys include respective key caps having first electromagnetic components. The mode control mechanism includes second electromagnetic components in the membrane circuit. The second electromagnetic components are operable to push the first electromagnetic components to raise the cups.

In some embodiments, the keyboard is foldable.

In some embodiments, the keyboard is detachable from the electronic device. Various embodiments of the subject matter described herein have been described above. The illustrations above are only for illustration without suggesting any limitations as to scope of the subject matter described herein. Without departing from the scope and spirit of various embodiments as illustrated, many modifications and changes are obvious to those skilled in the art. Selection of the terms used herein is intended to best explain the principle of respective embodiments, actual application, or improvement of technologies in the market, or enable other person of normal skill in the an to understand the embodiments disclosed herein.

What is claimed is:

1. An input device comprising:

one or more keys including respective cups and operable to be arranged on a base board of the input device in a first mode;

one or more depressions arranged in the base board and operable to receive the cups of the respective one or more keys in a second mode;

one or more latching mechanisms for the one or more keys, wherein each of the one or more latching mechanisms includes one or more pits and a bump, the bump operable to be inserted into the one or more pits; and a mode control mechanism operable to switch the input device between the first mode, the second mode, and a third mode, wherein:

switching the input device between the first mode and the second mode causes the cups of the respective one or more keys to be moved from the base board into the one or more depressions; and switching the input device between the second mode and the third mode causes the one or more latching mechanisms to lock the cups of the respective keys within the one or more depressions.

2. The input device of claim 1, further comprising:

a membrane circuit including one or more regions corresponding to the one or more keys.

3. The input device of claim 2, wherein the one or more keys further include respective scissor elements operable to be elastically deformed to trigger the membrane circuit.

4. The input device of claim 2, wherein a first pit, a second pit, and a third pit of the one or more pits are arranged on top of the membrane circuit.

5. The input device of claim 4, wherein the mode control mechanism is further operable to:

cause the bump to slide from the first pit to the second pit when the input device is orientated in a first direction; and cause the bump to slide from the second pit to the first pit when the input device is orientated in a second direction that is opposite from the first direction.

6. The input device of claim 4, wherein:

the bump is in the first pit when the input device is in the first mode;

the bump is in the second pit when the input device is in the second mode; and the bump is in the third pit when the input device is in the third mode.

7. The input device of claim 6, wherein, when the input device is in the third mode, inverting the input device causes the bump to slide from the third pit to the second pit.

8. The input device of claim 1, wherein the bump is arranged on a bottom portion of each respective scissor element.

9. The input device of claim 1, wherein switching the input device between the first mode and the second mode further causes the input device to power off.

10. The input device of claim 1, wherein switching the input device between the second mode and the third mode further causes at least one of: powering off the input device or locking a display screen associated with the input device.

11. A system comprising:

an input device including:

one or more keys including respective cups and operable to be arranged on a base board of the input device in a first mode;

one or more depressions arranged on the base board and operable to receive the cups of the respective one or more keys in a second mode;

one or more latching mechanisms for the one or more keys, wherein each of the one or more latching mechanisms includes a plurality of pits and a bump, the bump operable to be inserted into the plurality of pits; and a mode control mechanism operable to switch the input device between the first mode, the second mode, and a third mode, wherein:

switching the input device between the first mode and the second mode causes the cups of the respective one or more keys to be moved from the base board into the one or more depressions; and switching the input device between the second mode and the third mode causes the one or more latching mechanisms to lock the cups of the respective keys within the one or more depressions.

12. The system of claim 11, wherein the input device further includes a membrane circuit disposed on the base board, the one or more keys being located on the membrane circuit when the input device is in the first mode.

13. The system of claim 12, wherein the cups of the respective one or more keys are elastically deformable to trigger the membrane circuit, the triggering causing an electrical signal indicative of a character to be generated.

14. The system of claim 12, wherein the one or more depressions do not comprise the membrane circuit.

15. The system of claim 11, wherein:
each of the cups of the respective one or more keys comprises a magnetic component; and
each of the one or more depressions comprises an electromagnetic component.

16. The system of claim 15, wherein, when the input device is in at least one of the second mode or the third mode, the electromagnetic components in the one or more depressions attract the magnetic components of the cups of the respective one or more keys.

17. The system of claim 11, wherein the mode control mechanism operates magnetically to switch the input device between the first mode, the second mode, and the third mode.

18. The system of claim 11, wherein switching the input device from the first mode to the second mode or the third mode causes the input device to enter a reduced power state.

19. A method comprising:
receiving, by an input device, a selection input, the input device including:
one or more keys including respective cups and operable to be arranged on a base board of the input device in a first mode;
one or more depressions arranged in the base board and operable to receive the cups of the respective one or more keys in a second mode;
one or more latching mechanisms for the one or more keys, wherein each of the one or more latching mechanisms includes a first pit, a second pit, a third pit, and a bump, the bump operable to be inserted into one or more of the first pit, the second pit, or the third pit; and
in response to receiving the selection input:
switching the input device between the first mode and the second mode such that the cups of the respective one or more keys are moved from the base board into one or more depressions; or
switching the input device between the second mode and the third mode such that the one or more latching mechanisms lock the cups of the respective keys within the one or more depressions.

20. The method of claim 19, wherein switching the input device to the third more causes the input device to enter a powered off state.

* * * * *